Jan. 2, 1940.   S. H. CALDWELL   2,185,329
TACTUAL SIGNAL
Filed Aug. 31, 1936   2 Sheets-Sheet 1

INVENTOR
STUART H. CALDWELL
BY
ATTORNEYS

Jan. 2, 1940.   S. H. CALDWELL   2,185,329
TACTUAL SIGNAL
Filed Aug. 31, 1936   2 Sheets-Sheet 2

INVENTOR
STUART H. CALDWELL
BY
ATTORNEYS

Patented Jan. 2, 1940

2,185,329

UNITED STATES PATENT OFFICE 2,185,329

TACTUAL SIGNAL

Stuart H. Caldwell, Detroit, Mich., assignor to Kelch Heater Company, Detroit, Mich., a corporation of Michigan Application August 31, 1936, Serial No. 98,810

6 Claims. (Cl. 177—324)

This invention relates generally to motor vehicles and refers more particularly to improvements in safety devices for motor vehicles.

One of the principal objects of this invention is to provide safety equipment readily attachable to a motor vehicle and effective when the vehicle attains a pre-selected speed to impart a signal to the operator indicating that the desired maximum speed is being exceeded.

Another advantageous feature of this invention consists in the provision of a safety device of the character set forth rendering it possible to completely open the throttle without interference from any part of the device, irrespective of the speed selected to operate the signal. In other words, my improved signal device permits the quick acceleration often times required to meet certain emergency conditions.

The foregoing, as well as other objects, will be made more apparent as this description proceeds, especially when considered in connection with the accompanying drawings, wherein.

In accordance with this invention, a tactual signal is imparted to the operator through the accelerator pedal of the vehicle when the latter attains, or exceeds a pre-selected speed. It will also be apparent as this description proceeds that, although the tactual signal is applied after the pre-selected speed is exceeded, it does not interfere with operation of the vehicle throughout the higher speed range. This is desirable in that it affords the flexibility of control required for all driving emergencies.

Figure 1:
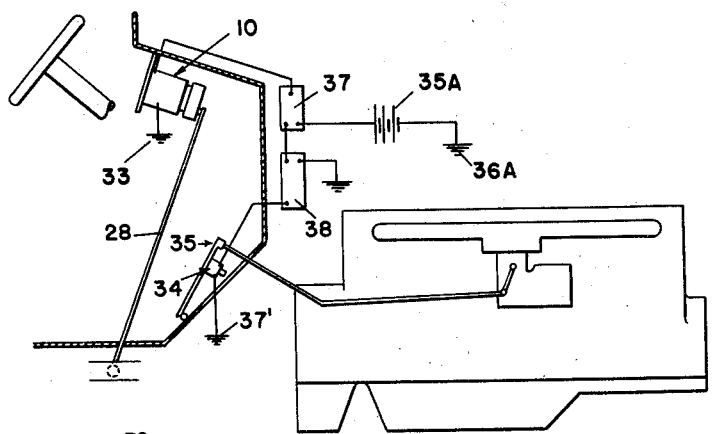
Figure 1 is a diagrammatic view of a portion of a motor vehicle equipped with a safety device constructed in accordance with this invention.
Figure 2:
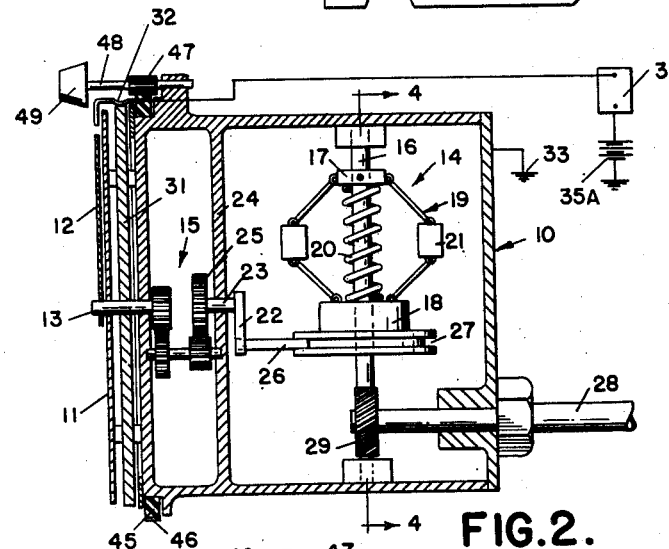
Figure 2 is an enlarged sectional view of the signal control apparatus.
Figure 4:
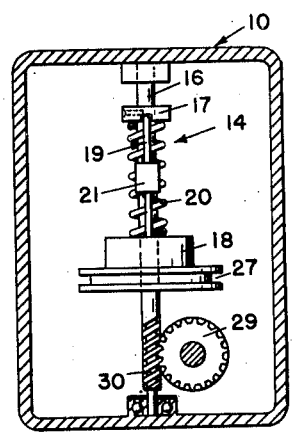
Figure 4 is a sectional view taken substantially on the plane indicated by the line 4—4 of Figure 2.
Figure 3:
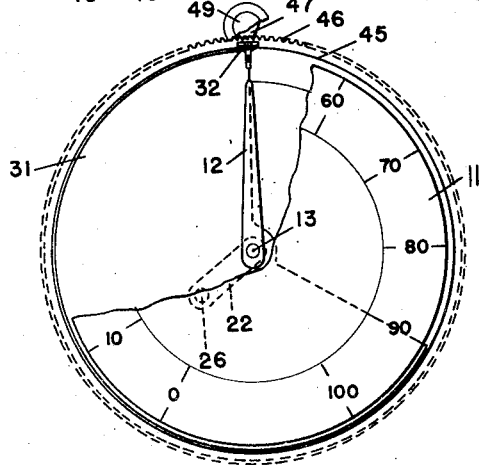
Figure 3 is a front elevational view of the construction shown in Figure 2.

In the embodiment of the invention illustrated in Figures 2 to 6 inclusive, the tactual signal is operated by a speed indicator resembling a tachometer of the fly-ball governor type. The tachometer is shown in Figure 2 as comprising a casing 10 having a dial 11 secured to the forward end thereof and having a needle 12 supported in advance of the dial for movement across the face of the same. The needle 12 is secured to the forward end of a shaft 13 journalled in the front wall of the casing and having the rear end operatively connected to a fly-ball governor 14 through the medium of reduction gearing 15. The governor 14 is of conventional construction having a shaft 16 journalled in opposite side walls of the casing and having collars supported upon the shaft in axial spaced relationship for relative movement toward and away from each other. In the present instance, the collar 17 is secured to the shaft 16 and the opposed collar 18 is mounted on the shaft for axial sliding movement relative thereto. The two collars are interconnected by means of the weight carrying links 19, and the collar 18 is normally urged in a direction away from the collar 17 by means of a coil spring 20 surrounding the shaft 16 between the collars. In accordance with conventional practice, the weight carrying links are arranged in pairs having their outer ends respectively pivotally connected to the collars and having their inner ends pivotally connected through the medium of centrifugal weights 21.

The weights 21 move radially outwardly with respect to the axis of the shaft 16 in dependence upon the speed of rotation of the shaft and, as the weights are displaced outwardly by the action of centrifugal force, the collar 18 is moved against the action of the spring 20 toward the collar 17. Upon reference to Figure 2, it will be noted that the collar 18 is operatively connected to the reduction gearing 15 by means of a crank 22 having a pin 23 at one end journalled in a partition 24 in the casing and secured to the drive gear 25 of the train of reduction gearing 15. The crank 22 is provided with a second pin 26 at the other end extending in a direction opposite to the direction of the pin 23 and engageable within an annular groove 27 formed in the collar 18. The arrangement is such that movement of the collar 18 axially toward the collar 17, under the influence of the weights 21, effects a swinging movement of the needle 12 over the face of the dial 11 through the train of gearing 15. It may be pointed out at this time that the ratio of the gearing 15 is such as to move the needle 12 one complete revolution over the dial when the collar 18 is moved to its fullest extent by the weights 21.

The shaft 16 of the governor is rotated from a selected part of the power plant of the vehicle through the medium of a conventional driving cable 28 operatively connected to a helically toothed gear 29 journalled within the casing and meshing with corresponding helical teeth 30 on the shaft 16. Owing to the fact that the diameter of the gear 29 is substantially greater than the tooth portion 30 of the shaft 16, it necessarily follows that the shaft 16 is rotated at a speed proportionately faster than the speed of the driving cable. This practice is usually followed in order to afford greater accuracy in indicating the speed of the vehicle.

It has been indicated above that the device briefly referred to is employed to operate the tactual signal, and this is accomplished herein without appreciably altering the construction or operation of the device. Referring again to Figure 2, it will be noted that a contact segment 31 is secured to the needle shaft 13 in rear of the needle 12 for rotation therewith as a unit and having the peripheral portion thereof adapted to engage a cooperating contact clip 32 supported upon the forward end of the casing for circumferential adjustment.

The contact segment 31 is grounded through the casing as indicated by the reference character 33, and the contact 32 is located in an electric circuit including the signal 34. The arrangement is such that the segment 31 cooperates with the contact clip 32 to form in effect a switch for controlling the operation of the signal in dependence upon the extent of rotation of the needle shaft 13. It will be noted from Figure 5 that the signal 34 is secured to the underside of the accelerator pedal 35 in a position to periodically strike the metallic reinforcement 36 embedded in the accelerator pedal and thereby impart a tactual signal to the operator.

Figure 6:
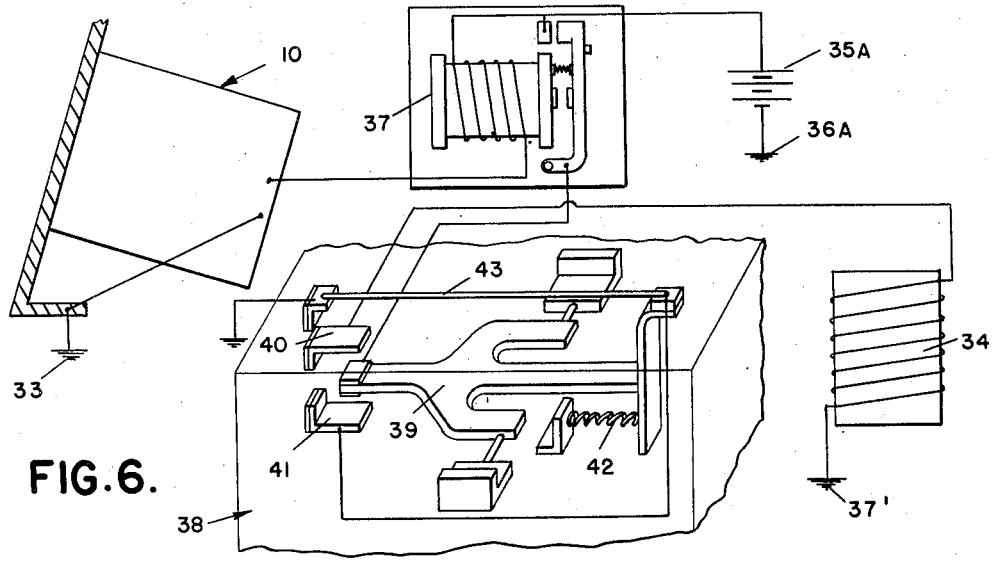
Figure 6 is a diagram illustrating the several parts of the control device in operative relationship.

In Figure 6 of the drawings, the electrical circuit for actuating the signal 34 in dependence upon engagement of the cooperating contacts 31 and 32 is shown. In this figure, it will be noted that one side of the source of electric energy or battery 35ª is grounded, as at 36ª, and that one side of the signal is also grounded, as at 37'. Inasmuch as the contact segment 31 has previously been described as grounded through the casing 10 in the manner designated by the reference character 33, it necessarily follows that the ground forms one side of the circuit. The other side of the circuit is effected by means of an electrical conductor connecting the cooperating contact 32 to the positive side of the battery 35ª through the medium of a relay 37 designed to be operated by a current of relatively small amperage. Briefly, the arrangement is such that when the cooperating contacts 31 and 32 are engaged, the coil of the relay is energized and closes a circuit to a contactor unit 38 constructed to effect the desired periodic operation of the signal. The contactor 38 comprises a flexible switch arm 39 electrically connected to the relay and adapted to swing between a pair of fixed contacts 40 and 41. When the switch arm 39 is in engagement with the contact 40, the circuit to the signal is closed and a spring 42 is provided for normally urging the switch arm in this position. Opposed to the spring 42 is a hot wire resistance 43 having one end connected to the ground and having the opposite end connected to the switch arm and to the contact 41. The connection between the hot wire 43 and the switch arm 39 is such as to cause the switch arm to move into engagement with the contact 41 when the hot wire cools sufficiently to effect the contraction thereof necessary for this limited movement of the arm. The arrangement is such that when the switch arm 39 is in engagement with the contact arm 41, the circuit to the signal is open, and the circuit to the hot wire is closed. The electrical energy flowing through the hot wire heats the latter to such an extent as to expand the same sufficiently to permit the spring to move the switch arm into engagement with the contact 40, wherein the circuit to the signal is again closed. Closing the circuit to the signal in the above manner opens the circuit to the hot wire and permits the latter to cool and contract sufficiently to again open the circuit to the signal and cause the electrical energy to flow through the hot wire. In this manner, electrical energy is periodically supplied to the signal in such a manner that the latter will deliver a definite tactual signal to the operator at predetermined intervals as long as the cooperating contacts 31 and 32 are in engagement. In other words, the cooperating contacts 31 and 32 form in effect a master switch controlling the operation of the signal, and the circumferential extent of the segment is such as to maintain the desired contact throughout the range from the pre-selected speed to the maximum rated speed of the engine. In other words, if the pre-selected speed is forty miles an hour, the cooperating contacts 31 and 32 will engage at this figure and will continue this engagement throughout the remaining speed range.

Reference has been made in the above to the fact that the operator is permitted to pre-select the speed at which the signal is adapted to operate, and this is accomplished herein by circumferentially adjusting the contact 32 relative to the dial 11. As shown in Figure 2, the contact 32 is secured to a ring 45 of dielectric material rotatably mounted on the casing 10 adjacent the dial 11 and having a series of rack teeth 46 on the periphery thereof for engagement with a pinion 47. The pinion 47 is secured to a shaft 48 suitably journalled on the casing and having a knob 49 at the outer end thereof located for convenient manipulation by the operator. With the above construction, it will be obvious that the contact 32 may be adjusted relative to the contact 31 throughout the circumferential extent of the dial 11, and thereby renders it possible to effect operation of the signal at practically any particular speed of travel. It will be observed from Figure 3 that the contact 32 is visible through the front end of the indicator and, accordingly, the indicia on the dial 11 may be employed to guide the operator in setting the contact at the desired speed.

Figures 5, 9:
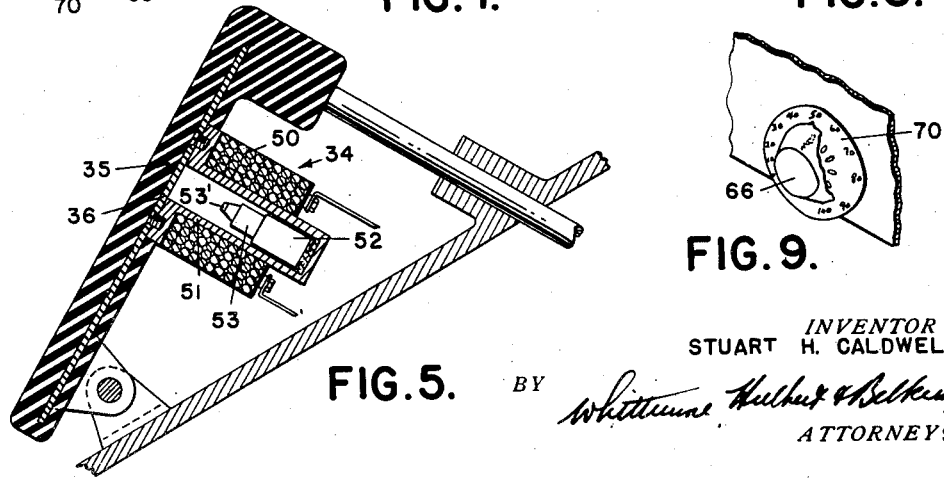
Figure 5 is a longitudinal sectional view through the accelerator pedal illustrating a signal attached thereto.
Figure 9 is a detailed perspective view of a part of the pre-selecting mechanism.

The signal 34 is shown in Figure 5 as being in the general form of a solenoid having a coil 50 surrounding a container 51 secured in any suitable manner to the underside of the reinforcing plate 36 on the accelerator. Slidably supported in the container 51 is a relatively soft steel core member 52 integral with a brass striker 53 having a relatively soft nose 53' of leather, for example, for contact with the metallic reinforcement 36 in the accelerator pedal. The above construction is such that when the coil 50 is energized by the contactor 38 through the master switch, the core is pulled by the magnetic field in a direction toward the accelerator pedal and thereby actuates the striker 53. By forming the body of the striker of brass or some similar material, the core 52 will tend to come to rest when the coil 50 is energized at a point higher in the coil than if the striker is formed of steel, thus producing a harder blow on the plate 36. Attention is called to the fact that a soft deadening material is placed in the bottom of the casing to reduce noise to the minimum.

Figures 7, 8:
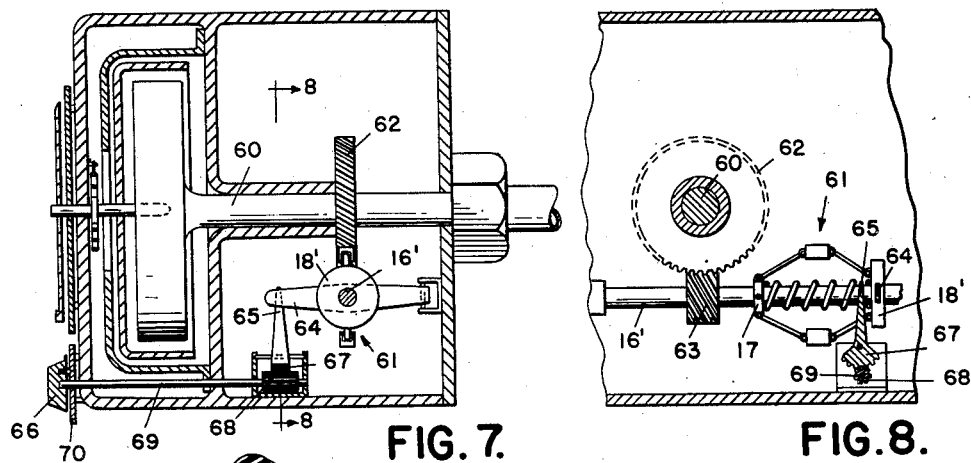
Figure 7 is a sectional view illustrating a modified form of signal controlling device.
Figure 8 is a sectional view taken substantially on the plane indicated by the line 8—8 of Figure 7.

The embodiment of the invention illustrated in Figures 7 and 8 differs from the one previously described in the form of the speed indicator employed to control the operation of the signal. As shown in Figure 7, a speedometer of the magnetically operated type is provided having a drive shaft 60 operatively connected to a flyball governor 61 similar in principle to the flyball governor 14 previously described. In detail, a gear 62 is secured to the drive shaft 60 and is adapted to mesh with a relatively smaller gear 63 secured to the governor shaft 16'. The gear ratio is such as to drive the governor shaft 16' at a considerably faster rate of speed than the drive shaft 60, and this is desirable in that it provides for obtaining greater accuracy.

Upon reference to Figure 8, it will be noted that the sliding collar 18' of the governor carries a switch contact 64 corresponding to the contact segment 31 in the first described form of this invention and adapted to engage a cooperating contact element 65 corresponding to the contact 32. In other words, the contacts 64 and 65 are respectively arranged in the circuit to the signal in exactly the same manner as the contacts 31 and 32 described in connection with the first form of this invention. It will be noted, however, that the contact 64 is moved into engagement with the contact 65 in dependence upon axial shifting movement of the collar 18' toward the fixed collar 17' of the governor.

It will, of course, be understood that variation of the distance between the two cooperating contacts 64 and 65 effects a corresponding variation in the speed at which the signal is adapted to operate, and the spacing between the two contacts is variable in the present instance through the medium of a control 66 operatively connected to the contact 65 to swing the latter toward or away from the contact 64. In detail, the contact 65 is secured to a rockshaft having a gear segment 67 meshing with a pinion 68 fixed on a shaft 69 journalled in the casing of the speed indicator and carrying the knob 66. The principle of operation and the ultimate result is the same as hereinbefore described in connection with the embodiment of the invention shown in Figures 1 to 6 inclusive.

Attention may be called to the fact that in the foregoing embodiment of the invention, provision is made for indicating predetermined increments of adjustment of the switch contacts 64 and 65. Upon reference to Figure 9, it will be noted that a plate 70 is fixed relative to the casing of the speed indicator and is provided with a plurality of circumferentially spaced notches corresponding to the divisions on the indicator dial of the speed unit. The control is, of course, rotatable relative to the plate and is provided with a spring pressed detent adapted to successively engage in the notches. If desired, the notches may be identified in a manner similar to the divisions on the indicator dial of the instrument, and the arrangement is, of course, such that when the detent on the control registers with the notch corresponding to the predetermined desired speed, the tactual signal will be operated by the device when the vehicle attains this speed.

Thus, from the foregoing, it will be observed that I have provided a relatively simple tactual signal for indicating to the operator the interval a pre-selected maximum speed is exceeded. It will also be noted that the signal does not interfere with the normal operation of the vehicle, and once the desired speed is selected, it requires no attention whatsoever on the part of the operator.

What I claim as my invention is:

1. A tactual signal for a motor vehicle comprising an accelerator pedal having a flat plate, resilient material surrounding said plate and adapted to be interposed between the foot of the operator and said plate, a striker assembly mounted directly to the rear of said plate, said assembly including a housing, a solenoid winding around said housing, a striker element movable in said housing toward and away from said plate, said striker normally spaced from said plate and adapted upon energization of said solenoid to be forcibly impelled into striking engagement with said plate.

2. A tactual signal for a motor vehicle comprising an accellerator pedal having a flat plate, resilient material surrounding said plate and adapted to be interposed between the foot of the operator and said plate, a striker assembly mounted directly to the rear of said plate, said assembly including a cup shaped housing having its open side attached to said plate, said housing extending downwardly therefrom, a solenoid winding around said housing, a striker element movable in said housing toward and away from said plate, said striker normally spaced from said plate and adapted upon energization of said solenoid to be forcibly impelled into striking engagement with said plate.

3. A tactual signal for a motor vehicle comprising an accelerator pedal having a flat plate adapted to be continuously engaged by the foot of the operator, a striker assembly mounted directly to the rear of said plate, said assembly including a housing, a solenoid winding around said housing, a striker element movable in said housing toward and away from said plate, said striker normally spaced from said plate and adapted upon energization of said solenoid to be forcibly impelled into striking engagement with said plate.

4. A tactual signal for a motor vehicle comprising a control pedal having a plate adapted to be continuously engaged by a foot of the operator, a solenoid beneath said pedal, a movable member actuated by said solenoid and adapted to impart sensible impulses upwardly against the bottom of said plate, and time delay means to delay energization of said solenoid when deenergized and deenergization of said solenoid when energized to render said impulses sensibly distinct.

5. A tactual signal for a motor vehicle comprising a control pedal having a plate adapted to be continuously engaged by a foot of the operator, a movable member beneath said pedal adapted to impart sensible impulses upwardly against the bottom of said plate, motor means for moving said member repeatedly against said plate, and time delay means associated with said motor means to render said impulses sensibly distinct.

6. A tactual signal for a motor vehicle comprising a control pedal having a flat metal plate, resilient tread material overlying said plate and adapted to be engaged by the foot of an operator, a striker assembly mounted directly to the rear of said plate, said striker assembly comprising a solenoid having a movable plunger and a striker element normally spaced from said plate and movable by said plunger in striking relation to said plate.

STUART H. CALDWELL.